United States Patent [19]
Mossi et al.

[11] Patent Number: 5,520,413
[45] Date of Patent: May 28, 1996

[54] PARTITIONED MULTI-CELL AIR BAG

[75] Inventors: Gilbert D. Mossi, Roy, Utah; Brett R. Garner, South Weber, Utah

[73] Assignee: Morton International, Inc., Chicago, Ill.

[21] Appl. No.: 526,526

[22] Filed: Sep. 11, 1995

[51] Int. Cl.$^6$ ............................................. B60R 21/24
[52] U.S. Cl. ............................................. 280/729; 280/743.1
[58] Field of Search ............................ 280/729, 743.1, 280/743.2, 728.1

[56] References Cited

U.S. PATENT DOCUMENTS

| | | | |
|---|---|---|---|
| 3,476,402 | 11/1969 | Wilfert | 280/729 |
| 3,752,501 | 8/1973 | Daniel et al. | 280/743.1 |
| 3,843,150 | 10/1974 | Harada et al. | 280/729 |
| 5,018,762 | 5/1991 | Suzuki et al. | 280/731 |
| 5,022,675 | 6/1991 | Zelenak, Jr. et al. | 280/743.1 |
| 5,253,892 | 10/1993 | Satoh | 280/731 |
| 5,310,214 | 5/1994 | Cuevas | 280/729 |

FOREIGN PATENT DOCUMENTS

| | | | |
|---|---|---|---|
| 2109637 | 9/1972 | Germany | 280/729 |
| 0132444 | 5/1989 | Japan | 280/729 |
| 2265122 | 9/1993 | United Kingdom | 280/743.1 |

*Primary Examiner*—Christopher P. Ellis
*Attorney, Agent, or Firm*—Philip C. Peterson; Gerald K. White

[57] ABSTRACT

A new and improved multi-cell, partitioned, air bag for cushioning engagement with an occupant in a motor vehicle when the air bag is rapidly inflated with gas. The air bag is formed of thin, flexible, pervious sheet material having an inlet for receiving gas at a forward end and a rearwardly facing cushioning surface formed for engaging the vehicle occupant when the air bag is inflated. A flexible, internal wall or partition extends between the inlet and the cushioning surface for dividing the air bag into an upper or head cushioning cell or chamber adapted for engaging the occupant's head and a lower, or torso cushioning cell or chamber adapted for cushioning the occupant's torso. Vents are provided for reducing the inflation pressure in the upper chamber relative to the lower or torso chamber to reduce or prevent head injury and abrasion yet provide a desired level of energy absorption for cushioning the occupant's torso.

16 Claims, 2 Drawing Sheets

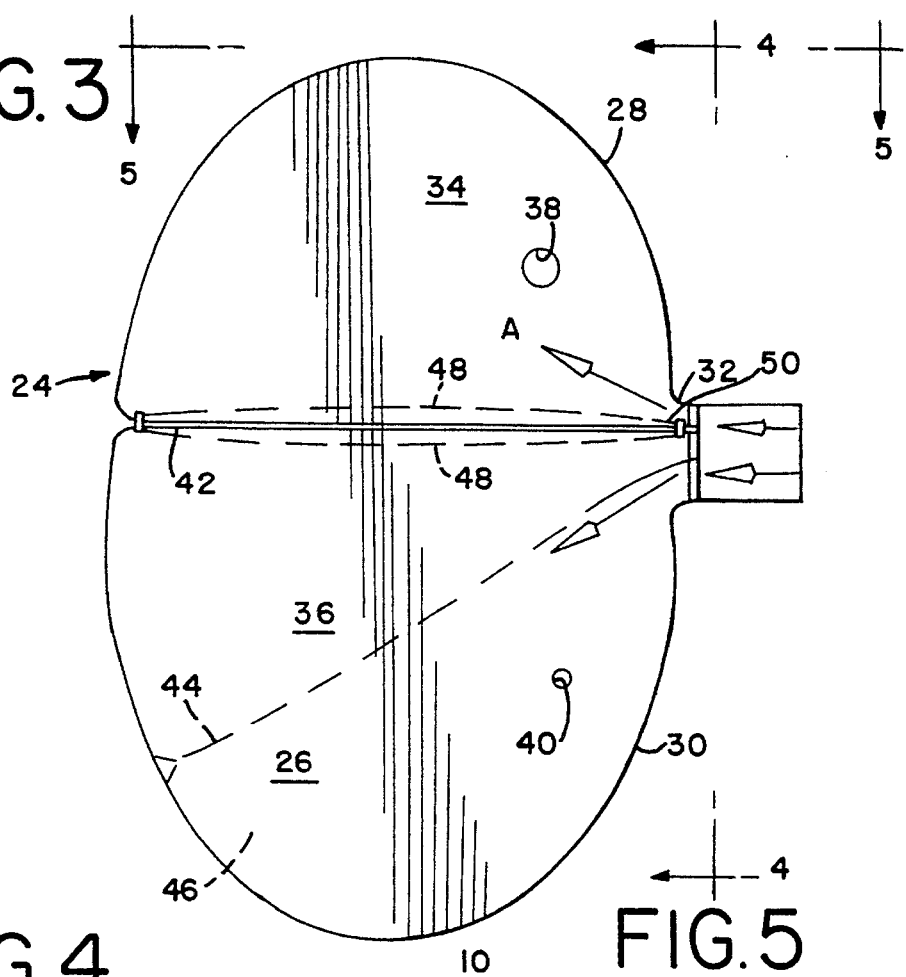
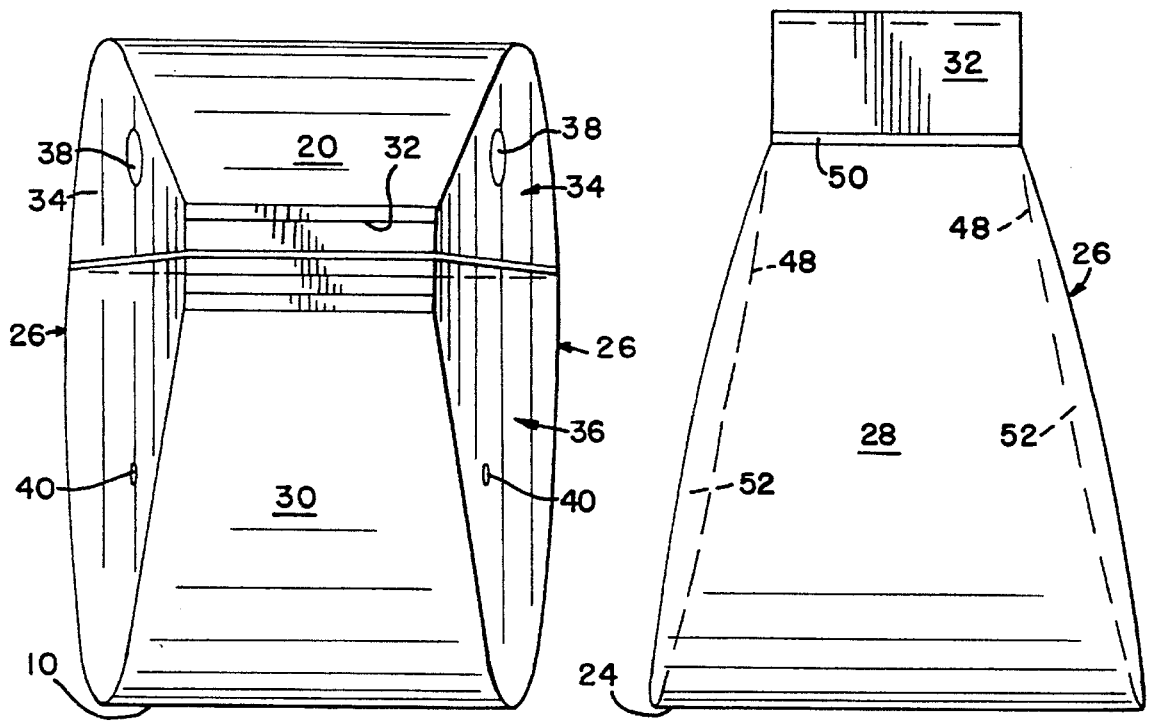

PARTITIONED MULTI-CELL AIR BAG

BACKGROUND OF THE INVENTION

1. Field of the Invention

The present invention relates to air bag restraint cushions for protecting occupants in motor vehicles and the air bag utilizes a concept incorporating a partitioned, multi-cell, sectional design, that provides for varying energy absorbing characteristics for an occupant's head, torso or other portion of the body. Different internal pressures are provided by sectionalized air bag compartments including a head impact portion or cell and a torso or leg impact portion. Because the head, neck and facial area of a vehicle occupant are generally more sensitive to deceleration or g-forces and to abrasion than the torso, an upper compartment or cell of the air bag is softer upon deployment and inflation whereas lower portion of the air bag, larger in size, has a higher pressure so that more energy is absorbed from an occupant in an accident.

2. Background of the Prior Art

U.S. Pat. No. 3,476,402 to Wilfert discloses a compartmented air bag having a circumferential chamber as an equalizing chamber surrounding a central portion so that on inflation upon impact, gas from the center portion flows out into the outer portion.

U.S. Pat. No. 3,752,501 to Daniel et al. discloses a wheel mounted inflatable air bag cushion that is compartmented to provide a peripheral ring compartment surrounding a center compartment overlying a steering wheel hub. The peripheral compartment provides greater resistance to collapse than the center compartment and provides means whereby a vehicle operator is guided toward the center section of the air bag cushion during inflation in an accident.

U.S. Pat. No. 5,018,762 to Suzuki et al. discloses a steering wheel mounted air bag with upper and lower portions with an internal restrictor system for dividing the inflation gas between the compartments or portions.

U.S. Pat. No. 5,253,892 to Satoh discloses a compartmented air bag wherein side sections which are expanded to a diameter much greater than a steering wheel so that the torso of an individual would engage outer areas of the bag initially and subsequently a center section. Areas of an inflating air bag are first engaged by a driver to protect against hitting the steering wheel and thereafter other areas are engaged.

OBJECTS OF THE INVENTION

It is an object of the present invention to provide a new and improved, rapidly inflatable air bag cushion for protecting an occupant in a motor vehicle.

It is another object of the present invention to provide a new and improved, rapidly inflatable, partitioned, multi-cell, air bag providing varying amounts of cushioning effect or energy absorption in different cells.

Another object of the present invention is to provide a new and improved, rapidly inflatable air bag of the character described providing a softer or lower pressure cushioning support for an occupant's head than for the torso or other body portions during inflation of the air bag.

Yet another object of the present invention is to provide a new and improved, rapidly inflatable air bag of the character described utilizing a portion between adjacent sections or cells for aiding in shaping the inflated air bag.

Still another object of the present invention is to provide a new and improved, rapidly inflatable air bag of the character described wherein a partition between different compartments or sections of the air bag serves as a tether for reducing stress on the air bag material during deployment thereby reducing the chances of seam or material failure.

Another object of the present invention is to provide a new and improved rapidly inflatable air bag of the character described employing differential venting in different sections or cells for controlling the inflation pressure in each cell during deployment of the air bag.

BRIEF SUMMARY OF THE PRESENT INVENTION

The foregoing and other objects of the present invention are accomplished in a new and improved, multi-cell, partitioned, inflatable air bag formed of thin, flexible sheet material adapted for cushioning restraint of an occupant in a motor vehicle. The air bag includes an inlet for receiving inflation gas at a forward end and a rearwardly facing cushioning surface established during and after rapid gas inflation including an upper portion for cushioning an occupant's head and a lower portion for cushioning a portion of the occupant below the head. The air bag includes an internal divider wall or partition extending from the inlet toward the cushioning surface for dividing the amount of gas flowing through the inlet into separate upper and lower cells or chambers. At least one of the chambers may be formed with a vent for reducing the inflation pressure relative to the other chamber for providing a softer cushioning effect on the occupant's head and a greater energy absorbing capability for cushioning the occupant below the head.

BRIEF DESCRIPTION OF THE DRAWINGS

For a better understanding of the present invention, reference should be had to the following detailed description taken in conjunction with the drawings, in which:

FIG. 3 is a side elevational view of an air bag in accordance with the present invention employing a stitched partition between upper and lower inflated sections;

FIG. 4 is a front elevational view of the air bag looking in the direction of arrows 4—4 of FIG. 3; and FIG. 5 is a top view of the air bag looking downwardly in the direction of arrows 5—5 of FIG. 3.

DETAILED DESCRIPTION OF A PREFERRED EMBODIMENT OF THE INVENTION

Figure 1:
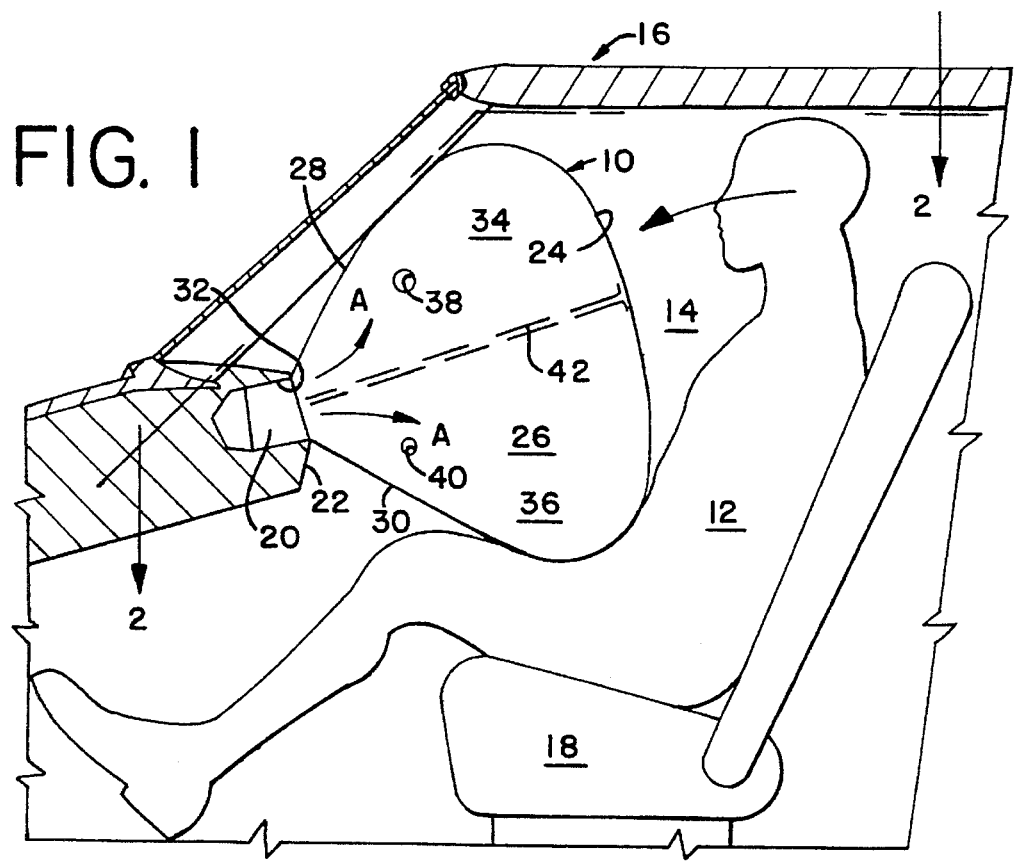
FIG. 1 is a side elevational view of a motor vehicle with an occupant therein illustrating a multi-cell, partitioned air bag in accordance with the features of the present invention in an inflated condition for cushioning support of the occupant.

Referring now more particularly to the drawings, therein is illustrated a new and improved inflatable air bag cushion 10 constructed in accordance with the features of the present invention and adapted to be rapidly inflated with gas for protecting a vehicle occupant 12 seated in a passenger compartment 14 of a motor vehicle 16 on a seat 18. The air bag 10 is normally contained in a folded-up condition in an air bag inflator module 20 mounted on a steering wheel 21 or behind an instrument panel 22 of the vehicle and is adapted to be rapidly inflated in the event of an emergency with inflation gas supplied from the module. When rapidly inflated, the folded-up air bag 10 moves rapidly out of the module 20 in a rearward direction toward the occupant 12 and provides cushioning restraint to prevent or reduce injury in a vehicular crash or accident.

When the air bag 10 is fully inflated, a relatively large, generally rectangular-shaped cushioning surface 24 is developed to engage the front of the vehicle occupant 12 and prevent injury. The air bag 10 has generally triangularly-shaped opposite sides 26 (FIG. 1) and upper and lower, sloping, top and bottom walls 28 and 30, respectively. The forward end portions of the side walls 26, top wall 28 and bottom wall 30 converge toward an inlet chute 32 having a forward end secured with the air bag module 20 to receive inflation gas. As shown in FIGS. 2, 4 and 5, the inflated air bag 10 increases in width or transverse dimension outwardly toward the occupant 12 to provide a maximum width for the cushion surface 24. Similarly, the vertical dimension of the inflated air bag 10 increases outwardly away from the inlet chute 32 toward the occupant 12 to provide a maximum vertical expanse for the cushion surface 24 as shown in FIGS. 1 and 3.

Figure 2:
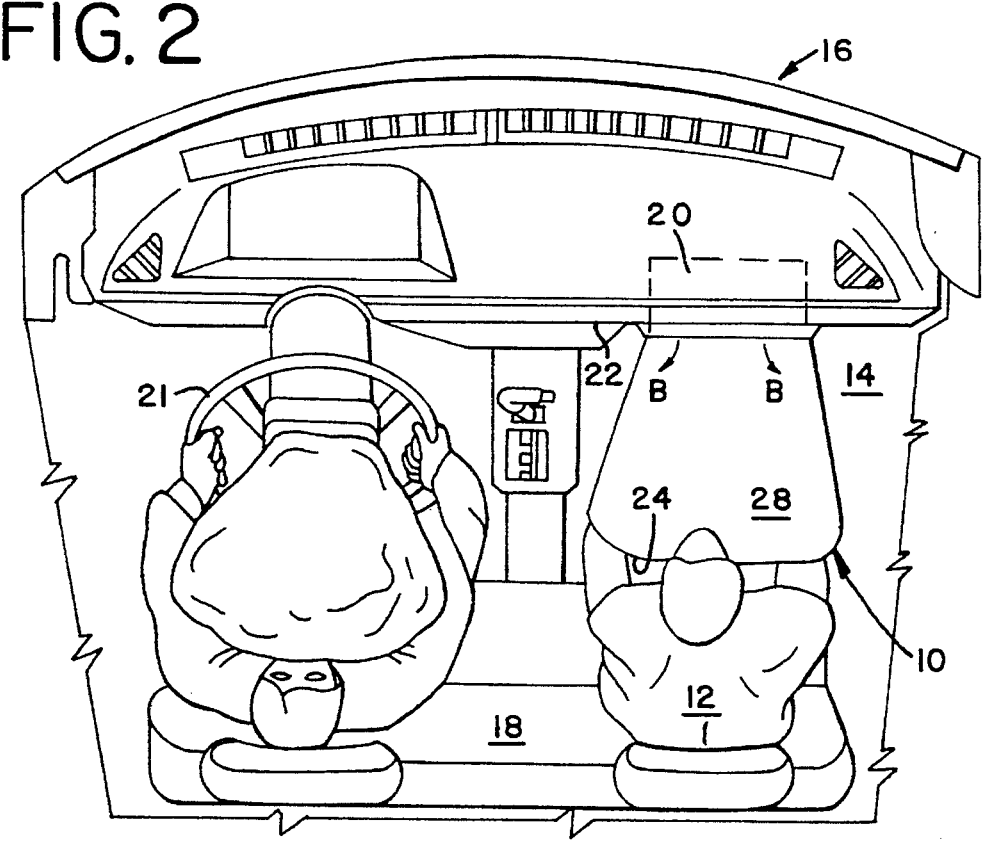
FIG. 2 is a top plan view taken substantially along lines 2—2 of FIG. 1.

As shown in FIGS. 1 and 2, the inflation gas from the air bag module 20, moves rearwardly toward the occupant 12 as the air bag 10 is inflated and spreads out laterally and vertically as indicated by the arrows "A" and "B". The high velocity gas flow through the relatively small size, rectangular flow cross-section of the inlet chute 32 is reduced in velocity as the flow cross-section of the air bag 10 enlarges in a direction toward the occupant 12. As the flow velocity is reduced during air bag inflation, the velocity head of the gas is converted to pressure head acting on the cushioning surface 24 inside of the air bag 10. The air bag 10 provides an ideal shape for effectively utilizing the available finite quantity of inflation gas that is rapidly discharged from the air bag module 20 to provide an extremely efficient cushioning action.

In accordance with the present invention the air bag 10 includes a plurality of separate inflation chambers, cells or compartments 34 and 36 for engaging different portions of an occupant's body when the air bag is rapidly inflated. A head impact section 34 of the air bag 10 may comprise approximately 40% of the total air bag volume and is located on the upper portion of the air bag so that the occupant's head and neck will be cushioned against impact during a typical frontal collision. The gas pressure within the upper cell or head compartment 34 is kept relatively low by choking the gas flow from the air bag module gas generator 20 at the air bag throat 32. Additionally, large size vents 38 are provided in side walls 26 in the head section 34 to maintain a desired pressure during inflation and deployment. A low permeability, fine weave material may be used in the head section 34 to reduce the amount of hot gas escaping from the cushion, thus lessening the possibility for burns and abrasions.

A lower portion or thoracic cell or section 36 of the air bag 10 may comprise approximately 60% of the total gas volume when the air bag is inflated and is designed to react against and cushion the occupant's torso, below the head and neck during a frontal collision. The lower cell or section 36 receives the majority of the gas from the air bag module gas generator 20 and has small venting holes to keep the internal pressure relatively high. Because the lower portion 36 of the air bag 10 performs a different function than the upper or head impact section 34, a coarser weave, stranded material with high strength characteristics is employed for the lower cell.

A divider sheet or wall structure 42 separates the two compartments or sections 34 and 36 and serves several purposes in acting to maintain a pressure differential between the compartments. During deployment of the air bag 10 the wall structure 42 acts as a tether to keep the air bag in a lower position as the air bag exits the module 20. This tethering action helps to prevent neck injuries and injuries incurred by "out-of-position" occupants 12. The wall structure 42 also acts as a structural member helping to maintain the proper shape and size of the air bag 10 and may be made of a mildly elastic material in order to absorb some of the energy during deployment of the air bag 10 thus reducing stresses on other parts of the air bag.

A design variation of the partitioned air bag 10 may include another dividing wall structure 44 (FIG. 3) spaced below the upper wall structure 42 forming a third and lowest section or compartment 46 for a higher degree of design tailoring to meet particular requirements of occupant loading during a collision.

Referring to FIGS. 3 and 5, an alternative wall structure 46 comprising an integrally stitched-in-place large loop of material sewn out of a main cushioning panel 24 of the air bag 10 is attached at a front portion 50 adjacent the inlet section 32 and at a rear portion by stitching 54. As shown in FIG. 5, a loop of material making up the wall structure 48 is not attached to the air bag side panels 26 leaving open spaces 52 along each side for allowing limited gas transfer between the cells or compartments 34 and 36 around the side edges of the internal wall structure.

The air bag 10 can be tailored to optimize the cushioning provided for an occupant's head and the torso on an individual basis and to provide different operating pressures for each separate compartment, cell or section. Sections or cells having different operating pressures are incorporated into the air bag to maximize the occupant restraint or cushioning effect. Moreover, the possibility of incidental injury to an occupant from air bag interaction and/or abrasion is reduced as is the likelihood of a neck injury from overextension of the head before cushioning restraint actually takes place. The probability of burns and abrasions to the face is greatly reduced and "out-of-position" occupant incidental injury is decreased.

The design using a large seamed loop, wall structure 48 offers cost savings over a more conventional tethered application while still realizing benefits from sectionalizing or partitioning of the air bag into plural sections. The integral tethering action of the internal divider wall helps reduce deployment stresses within the air bag and reduces the chance for seam or material failures.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An air bag for cushioning an occupant in a motor vehicle when rapidly inflated with gas said air bag being formed of thin, flexible sheet material having a unitary inlet at a forward end for receiving gas from a single source of gas and a rearwardly facing cushioning surface for engaging the vehicle occupant when the air bag is inflated, a flexible internal wall dividing said inlet into upper and lower inlet sections extending between said inlet and said cushioning surface for dividing said air bag into an upper chamber adapted for engaging the occupant's head and a lower chamber adapted for engaging the occupant below the head, and an open vent formed in said sheet material of said upper chamber spaced away from said inlet for reducing the inflation pressure of said upper chamber relative to said lower chamber.

2. The air bag of claim 1, including:

an open vent formed in said sheet material of said lower chamber spaced from said inlet for reducing said inflation pressure in said lower chamber.

3. The air bag of claim 2, wherein: said open vent means in said upper chamber is larger than said open vent in said lower chamber.

4. The air bag of claim 1, wherein:

said upper chamber is formed of low permeability, fine weave material.

5. The air bag of claim 4, wherein:

said lower chamber is formed of material having a coarser weave than the material of said upper chamber.

6. The air bag of claim 5, wherein:

said lower chamber is formed of high strength, coarsely woven stranded material.

7. The air bag of claim 1, wherein:

said internal wall is formed by an integral loop of material joining said cushioning surface.

8. An inflatable air bag formed of thin, flexible sheet material adapted for cushioning restraint of an occupant in a motor vehicle, comprising:

a unitary inlet at a forward end for receiving inflation gas from a single source of gas, and a generally rearwardly facing cushioning surface established during rapid gas inflation including an upper portion for cushioning an occupant above the body and a lower portion for cushioning an occupant below the head, an internal divider wall dividing said inlet into upper and lower inlet sections and extending between said inlet and said cushioning surface for dividing gas flow through said inlet into separate upper and lower chambers, and an open vent formed in said sheet material away from said inlet in said chamber for reducing the inflation in pressure relative to the lower chamber for providing a softer cushioning effect for the head of the vehicle occupant.

9. The air bag of claim 8, wherein:

said internal divider wall includes a plurality of spaced apart walls dividing said inflated air bag into a plurality of lower chambers for cushioning the occupant below the head.

10. The air bag of claim 8, wherein:

at least one of said plurality of lower chambers includes an open vent formed in said sheet material away from said inlet for providing a softer cushioning effect for at least a portion of the occupant's torso.

11. The air bag of claim 8, wherein:

said open vent in said upper chamber is dimensioned to provide a lower gas pressure upon inflation than the inflation pressure in said lower chamber.

12. The air bag of claim 8, wherein:

said air bag includes a pair of opposite side walls and said internal divider wall has opposite side edges spaced inwardly of said opposite side walls creating open spaces for permitting inflation gas flow between upper and lower chambers away from said inlet.

13. An inflatable air bag formed of thin, flexible, pervious sheet material adapted to be rapidly inflated with gas from a single source through a unitary inlet at a forward end to provide cushioning restraint at an opposite end surface for engaging a vehicle occupant, comprising:

a first cushioning chamber adapted to be supplied with gas from said inlet to provide soft cushioning at a relatively low pressure;

a separate, second cushioning chamber adapted to be supplied with gas from said inlet to provide firmer cushioning at a relatively high pressure;

divider means separating said inlet into separate inlet sections in direct communication with said first and second cushioning chambers for restricting gas flow therebetween during rapid inflation with gas from said inlet, said divider means extending between said inlet and said opposite end surface for dividing the flow of inflation gas from said inlet between said first and second compartments; and an open vent formed in said sheet material of said first cushioning chamber away from said inlet for reducing the inflation pressure therein below that in said second cushioning chamber.

14. The air bag of claim 13, wherein:

said divider means is elastic.

15. The air bag of claim 13, wherein:

said divider means comprises an internal tether in said air bag for limiting the movement of said opposite end surface toward the occupant during air bag inflation.

16. The air bag of claim 15, wherein:

said internal tether has opposite side edges spaced apart from opposite sides of said air bag when inflated permitting gas flow between said first and second chambers.

* * * * *